United States Patent [19]

Betush

[11] Patent Number: 5,026,020

[45] Date of Patent: Jun. 25, 1991

[54] MINIATURE COMPOUND LEVER PINCH VALVE/REGULATOR

[76] Inventor: Frank A. Betush, 375 Hargrave, Inglewood, Calif. 90302

[21] Appl. No.: 522,599

[22] Filed: May 14, 1990

[51] Int. Cl.$^5$ ............... F16K 7/07; F16K 31/126; F16L 55/14

[52] U.S. Cl. ............................ 251/5; 251/9; 251/58; 251/61; 604/250

[58] Field of Search ............... 251/5, 7, 9, 58, 61; 604/34, 250

[56] References Cited

U.S. PATENT DOCUMENTS

| | | | |
|---|---|---|---|
| 1,284,465 | 11/1918 | Ryan | 251/5 |
| 2,483,954 | 10/1949 | Weiss | 251/5 |
| 2,517,820 | 8/1950 | Aagaard | 251/5 |
| 2,582,917 | 1/1952 | Aagaard | 251/5 |
| 2,588,212 | 3/1952 | Custer | 251/5 |
| 2,734,526 | 2/1956 | Aagaard | 251/5 |
| 3,399,693 | 9/1968 | Toma | 251/5 |
| 3,468,342 | 9/1969 | Craft | 251/5 |
| 3,675,656 | 7/1972 | Hakim | 251/5 |
| 4,071,039 | 1/1978 | Goof | 251/5 |
| 4,372,345 | 2/1983 | Mehus | 251/5 |

FOREIGN PATENT DOCUMENTS 1378042 10/1964 France .................. 251/5

Primary Examiner—George L. Walton

[57] ABSTRACT

A miniature compound lever fluid-operated pinch valve/regulator in which a swell tube is sandwiched between a rectilinearly movable planar member and a frame, and in which the swell tube responds to pressurized fluid to displace the planar member from the frame. A spring-biased lever engages the planar member to collapse the swell tube in the absence of the pressurized fluid. A pinch lever is also mounted in the frame and is engaged by the spring-biased lever. The result is a compound lever mechanism which responds to the swelling and collapse of the swell tube in response to a pressurized fluid introduced into the swell tube to cause the mechanism to perform a pinching function on a resilient fluid-carrying tube passing through the valve/regulator.

12 Claims, 4 Drawing Sheets

MINIATURE COMPOUND LEVER PINCH VALVE/REGULATOR

BACKGROUND OF THE INVENTION

The invention is concerned with fluid-operated pinch valve/regulators. Such devices in general are known to the art and are disclosed, for example, in Craft U.S. Pat. No. 3,468,342 and in Goof U.S. Pat. No. 4,071,039.

The present invention provides a pinch valve/regulator which includes a resilient swell tube closed at one end. The swell tube responds to a pressurized fluid to inflate, and it responds to a spring-biased lever within the unit to deflate when the pressurized fluid is removed. The swell tube causes a planar member in the unit to move in one direction when it inflates, and the spring-biased lever moves the planar member in its opposite direction when the swell tube deflates. The planar member is coupled through the spring-biased lever to a pinch lever which, in turn, performs a pinching function on a fluid-carrying resilient tube within the unit. The fluid-carrying tube is interposed between a pinch bar in the device and one end of the pinch lever.

A feature of the device of the invention is that it incorporates compound levers that provide an enhanced pinching action by the mechanism in an extremely small space. Specifically, the levers provide a mechanical advantage, so that the displacement of the planar member within the device produces a relatively high pinching force against the resilient fluid-carrying tube.

In general, an objective of the present invention is to provide a miniature pinch valve/regulator which is operated by a swell tube in response to the introduction of pressurized fluid. The result is an inherently simple pinch valve/regulator, which does not require pistons, diaphragms, O-rings, or the like in order to achieve its intended purpose.

Another objective of the invention is to provide such a pinch valve/regulator in which there is no interference between the pressurized control pilot fluid flowing into the swell tube, and the controlled fluid flowing through the fluid-carrying tube which is selectively pinched by the device. This obviates the possibility of cross-contamination between the actuating fluid and the controlled fluids in the event of failure of one of the tubes.

Another objective is to provide such an improved valve/regulator which may be manufactured in an expeditious and efficient manner with a low failure rate.

Another objective of the invention is to provide a miniature pinch valve/regulator which may be easily reconfigured at the factory or by the user by repositioning the tubes in the device, or by adding additional tubes and/or tee fittings to enable the device to perform a wide variety of valving and regulating functions.

A further objective of the invention is to provide an improved valve/regulator device which is inherent resistent to clogging.

Yet another objective of the invention is to provide an improved valve/regulator device which may be adjusted significantly to extend its useful life without disassembling the device and without the need for servicing tools, this being achieved by the ease with which the internal pinch tubes of the device may be repositioned.

Another objective of the invention is to provide an improved valve/regulator device which may be sealed to insure against leakage of fluids from the device to the external environment in the event of failure of its pinch tubes, and conversely to inhibit the entry of environmental contaminants or pressurized fluids into the housing of the device.

A more specific objective of the invention is to provide an improved device which in one embodiment to be described offers extremely fine flow control and enables the fluid flow to be turned off with no fluid being retracted into the outlet of the device and with no emission of fluid through the outlet after the device has been shut off.

Yet another objective of the invention is to provide such an improved valve/regulator which is relatively simple to install and service.

DETAILED DESCRIPTION OF THE ILLUSTRATED EMBODIMENT

Figure 1:
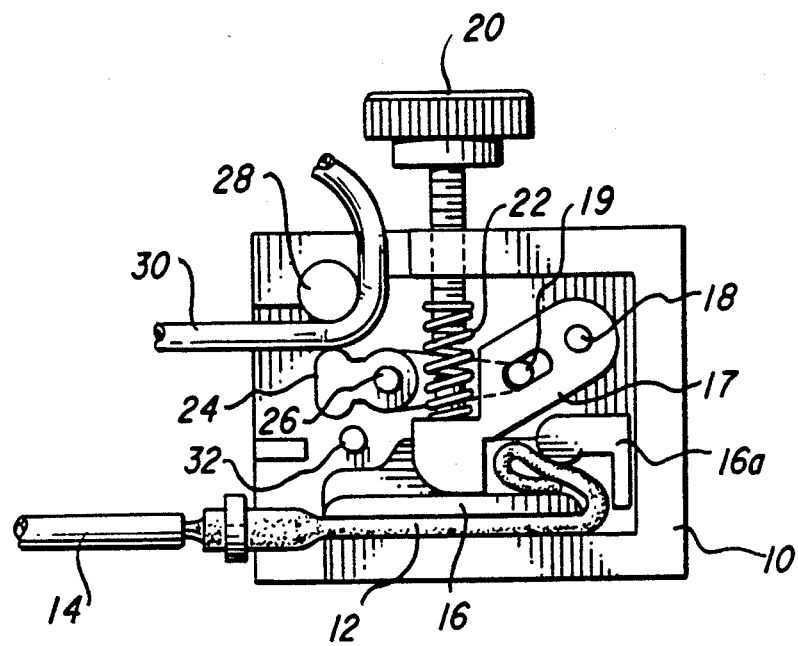
FIG. 1 is a side view of a pinch valve/regulator constructed in accordance with one embodiment of the invention.
Figure 3:
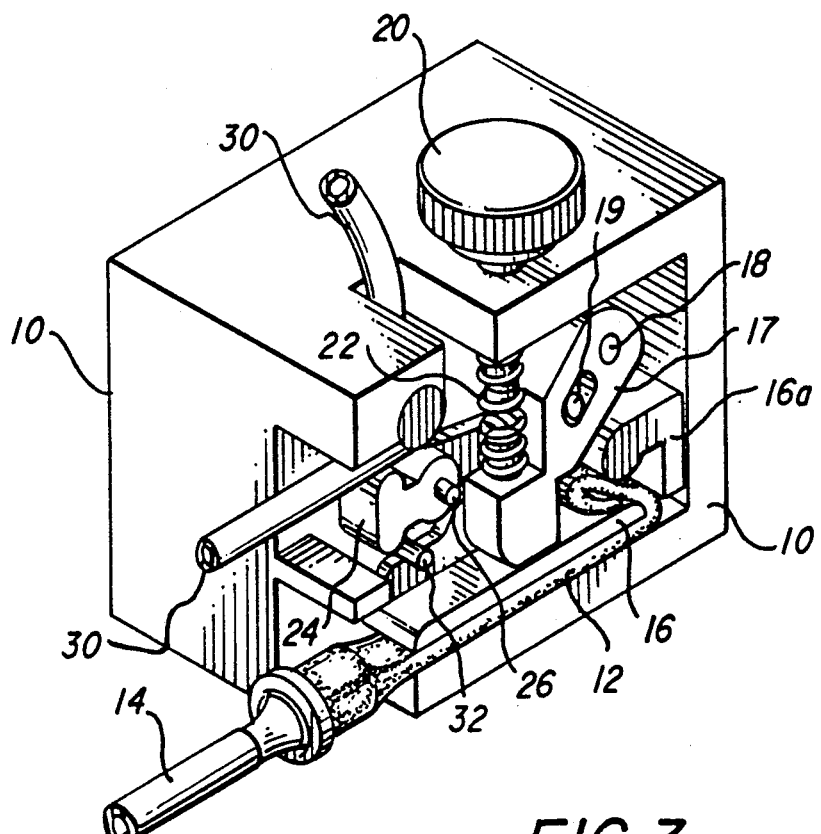
FIG. 3 is a perspective representation of the pinch valve/regulator of FIG. 1 on a slightly enlarged scale.
Figure 2:
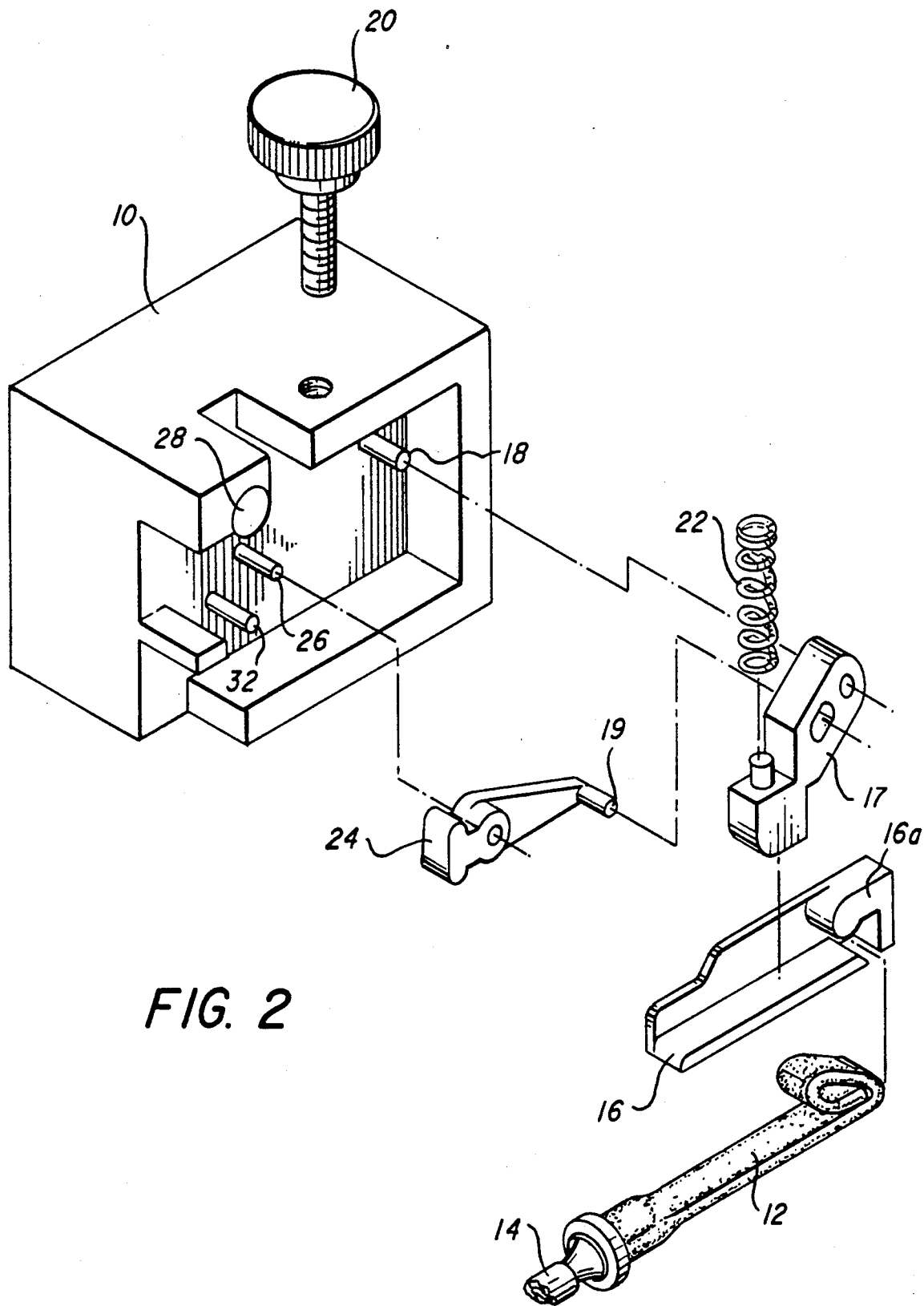
FIG. 2 is an exploded perspective view of the valve/regulator of FIG. 1 showing the various components which make up the device.

As shown in FIGS. 1–3, the pinch valve/regulator of the first embodiment includes a housing 10. A resilient swell tube is pinched in between a wall of the housing 10 and a planar member 16 which is mounted for rectilinear movement within the housing. One end of the planar member 16 includes an integral bracket 16A which serves to hold the end of the swell tube folded around the planar member and to assist in holding the end of the swell tube in a sealed condition. Pressurized fluid is introduced into the swell tube 12 through a tube 14.

A lever 17 is pivotally mounted within housing 10 about a pin 18. Lever 17 is biased against the planar member 16 by a spring 22. The force of spring 22 may be adjusted by a screw 20. A pinch lever 24 is pivotally mounted in housing 10 about a pivot pin 26. The right-hand end of the pinch lever 24 extends through a slot 19 into the spring-biased lever 17. The other end of pinch lever 24 is shaped to perform a pinching function with respect to pinch bars 28 and 32 which are mounted in the frame. A fluid-carrying resilient tube 30 is shown as being interposed between pinch bar 28 and the end of pinch lever 24.

In the embodiment of FIGS. 1–3 when pressurized fluid is introduced into the swell tube 12 through tube 14 to cause the swell tube to inflate the planar member 16 moves upwardly in housing 10 against the end of lever 17 and against the bias force of spring 22. The resulting movement of lever 17 causes lever 24 to pivot about its pivot pin 26 so that the left-hand end of lever 24 moves away from pinch bar 28 to release the pinching action on the fluid-carrying tube 30.

When the fluid pressure is removed from swell tube 12, the force of spring 22 causes the swell tube to collapse, and thereby causes the left-hand end of pinch lever 24 to move towards pinch bar 28 thereby pinching tube 38 and interrupting the flow of pressurized fluid through the tube.

Accordingly, when tube 30 is interposed between pinch bar 28 and the end of lever 24, a pinching action is obtained when the pressurized fluid is released from tube 12.

Should the fluid-carrying tube 30 be interposed between pinch bar 32 and the left-hand end of lever 24, the pinching action is obtained when the fluid pressure is introduced into the swell tube 12, and the pinching action is terminated when fluid pressure is released from swell tube 12.

If so desired, separate fluid-carrying tubes may be interposed between the respective pinch bars 28, 32 and the end of lever 24, so that a pinching action may be achieved in one of the tubes when fluid pressure is introduced into swell tube 12, and so that pinching action may be achieved in the other tube when the fluid pressure is removed from the interior of swell tube 12.

To counteract fatigue at the pinch point of tube 30, or to clear trapped debris, the tube may be moved to a new pinch point. In this simple manner, the useful life of the valve may be extended easily and conveniently, and without the need for tools or part replacements.

The device of FIGS. 1-3 may be used as a regulator by placing tube 30 between pinch lever 24 and pinch bar 32, and by coupling the outlet of tube 30 to the inlet of swell tube 12 through a conventional t-fitting which is also coupled to an extension of tube 30. Then, as pressurized fluid is introduced into the inlet of tube 30, the pressure applied to swell tube 12 increases until it is sufficient to cut off the supply of pressurized fluid to the swell tube as the pinch lever 24 moves towards pinch bar 32. Upon decrease of fluid pressure through tube 30, and through its extension, the pressure in the swell tube is reduced and the reverse action occurs. In this manner, the pressurized fluid flowing through the extension of tube 30 from the t-fitting may be regulated to a desired pressure level. This pressure level is adjustable by turning knob 20.

Figure 4:
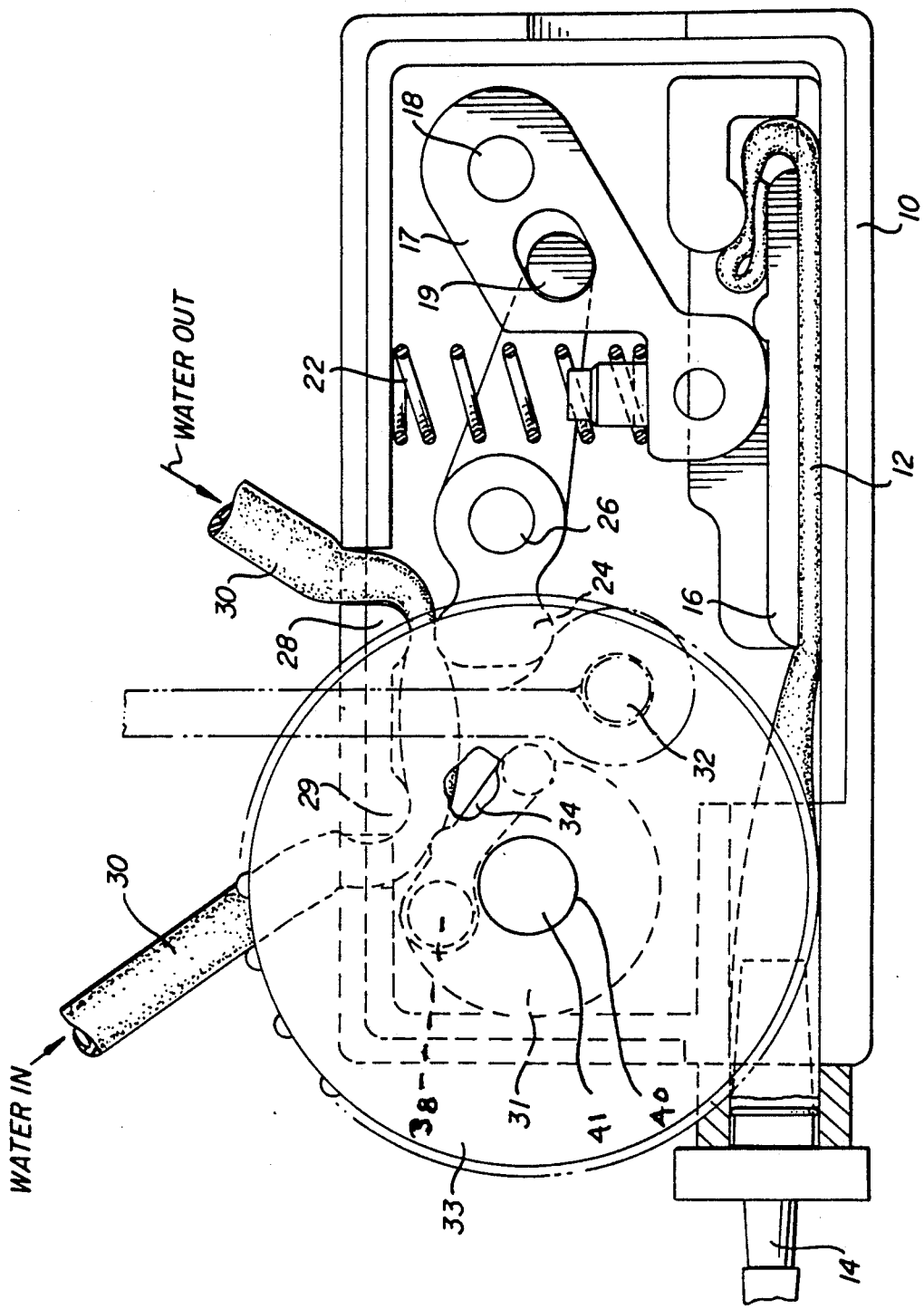
FIG. 4 is a side view of a pinch valve/regulator constructed in accordance with a second embodiment of the invention.
Figure 5:
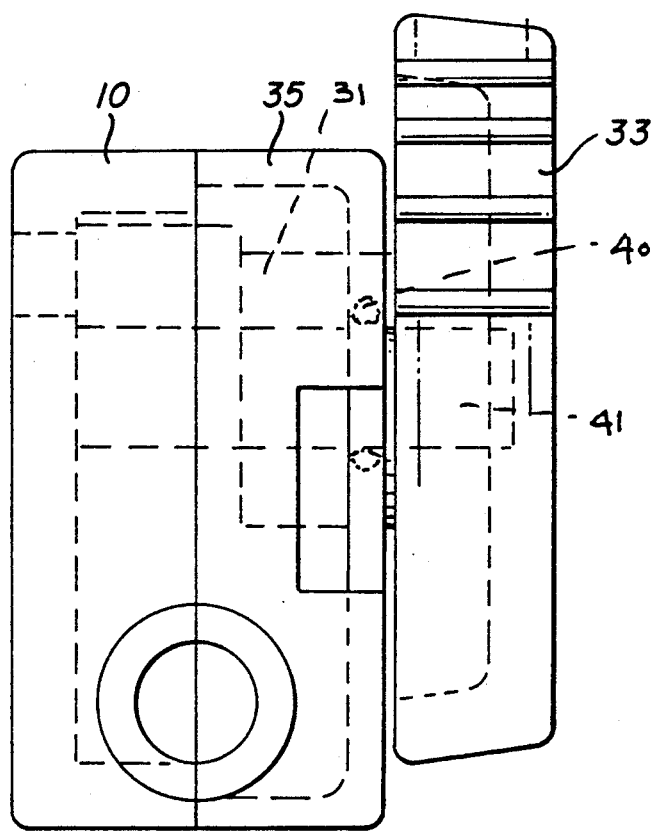
FIG. 5 is an end view of the device of FIG. 4.

A second embodiment of the invention is shown in FIGS. 4 and 5. FIG. 4 shows a side view of the second embodiment, similar to the view of FIG. 1, and FIG. 5 shows an end view of the embodiment of FIG. 4. In the embodiment shown in FIGS. 4 and 5, elements which are similar to those of the previous embodiment have been designated by the same numbers.

A cover 35 is provided, as shown in FIG. 5. The cover is essentially rectangular and it may be fitted over the open face of the housing and sealed to the housing by appropriate elastomeric seals or the like. The cover forms a chamber within housing 10, and it prevents the escape of fluids which may accumulate within the housing should the tubes 12 or 30 fail. The cover also prevents environmental fluids from entering into the housing.

A fine manual fluid control is added in the embodiment of FIGS. 4 and 5, and this control comprises a knob 33 which is coupled by a shaft 41 extending through the cover 35 to a cam 31, the shaft 41 coupling the knob 33 to cam 31 being sealed as it passes through the cover by a seal 40. As knob 33 is rotated, member 31 varies the position of a pinch flow lever 34 which is pivotally mounted on a pivot pin 38. As lever 34 turns on pivot pin 38, it causes a ridge on its upper surface to pinch tube 30 as it moves upwardly towards pinch bar 29 on housing 10. This action provides an additional variation for the flow of pressurized fluid through tube 30 which is interposed between pinch bar 29 and the ridge on pinch lever 34. A compound action is provided which causes a very small movement of the pinch flow lever 34 toward and away from the pinch flow bar 39 with respect to the angular rotation of cam knob 33. The additional flow metering of the pressurized fluid through tube 30 is therefore extremely fine. Due to the proximity of pinch points 28 and 29, a very low volume of pressurized fluid and a short path of tubing exists which minimizes elastomeric expansion effects and subsequent internal volumetric changes in the fluid pathway. This minimizes extrusion of the dispensed fluid after shut off, and also insures that there is no fluid drawn back into the valve by such volumetric changes after shut off.

As in the previous embodiment, the sealing surface of the pinch points of tube 30 may be changed merely by moving the tube axially. The direction of movement is preferably such that any debris trapped at the pinch points is carried downstream to clear clogging as well as to provide new tubing pinch points. This simple capability significantly extends the useful life of the valve without requiring the user to interrupt the pressurized fluid flow path, or disassemble the device, or disconnect the device from the pressurized system in which it is being used.

The invention provides, therefore, an miniature compound lever pinch valve/regulator mechanism which uses relatively few component parts, and which is highly efficient in its operation, and easy to service. It will be appreciated that while particular embodiments of the invention have been shown and described, modifications may be made. It is intended in the claims to cover all modifications which come within the true spirit and scope of the invention.

I claim:

1. A pinch valve/regulator comprising: a housing; a planar member mounted in said housing for rectilinear movement therein; a swell tube positioned between said planar member and said housing to displace said planar member with respect to said housing in response to the introduction of pressurized fluid into said swell tube, said planar member being disposed along substantially the entire length of said swell tube, a pinch bar mounted in said housing; a pinch lever pivotally mounted in said housing with one end in pinching relationship with said pinch bar; and actuating lever pivotally coupled to said housing and being interposed between said pinch lever and said planar member with a portion of said actuating lever being in engagement with said planar member to enable rectilinear movement of said planar member to cause said pinch lever to perform a pinching function to control a fluid through the pinch valve/regulator.

2. The pinch valve/regulator defined in claim 1, in which said pinch bar is located with respect to said pinch lever so that expansion of said swell tube causes the end of said pinch lever to move towards said pinch bar into a pinching relationship therewith.

3. The pinch valve/regulator defined in claim 1, in which said pinch bar is positioned with respect to the end of said pinch lever so that expansion of said swell tube causes the end of said pinch lever to move away from said pinch bar and out of pinching relationship therewith.

4. The pinch valve/regulator defined in claim 1, in which said actuating lever is pivotally mounted to said housing at one end and engages said planar member at its other end, and in which the other end of said pinch lever extends through a slot in said second lever.

5. The pinch valve/regulator defined in claim 1, and which includes resilient means mounted in said housing for biasing said planar member against said swell tube to collapse said swell tube in the absence of said pressurized fluid.

6. The combination defined in claim 5, and which includes means mounted on said housing for adjusting the force exerted by said resilient means.

7. The pinch valve/regulator defined in claim 1, and which includes resilient means mounted in said housing and engaging said actuating lever for causing said actuating lever to bias said planar member in a direction to collapse said swell tube in the absence of said pressurized fluid.

8. The combination defined in claim 7, and which includes means mounted on said housing for adjusting the force exerted by said resilient means.

9. The pinch valve/regulator defined in claim 1, and which includes a cover sealed to said housing to provide a sealed chamber within said housing.

10. The pinch valve/regulator defined in claim 1, and which includes a second pinching mechanism in said housing to perform a second pinching action on a pressurized fluid bearing tube displaced along said tube from the pinching action performed by said pinch bar and pinch lever.

11. The pinch valve/regulator defined in claim 10, and which includes a manually operated knob mounted in said housing and coupled to said second pinching mechanism for operating said second pinching mechanism.

12. The pinch valve/regulator defined in claim 11, and which includes a cam mounted within said housing coupled to said knob, and a pinch lever pivotally mounted in said housing to be actuated by said cam to perform a pinching function on the fluid pressure bearing tube.

* * * * *